Oct. 5, 1926.
L. H. PURNELL
SHEARING TOOL
Filed March 28, 1925
1,602,169
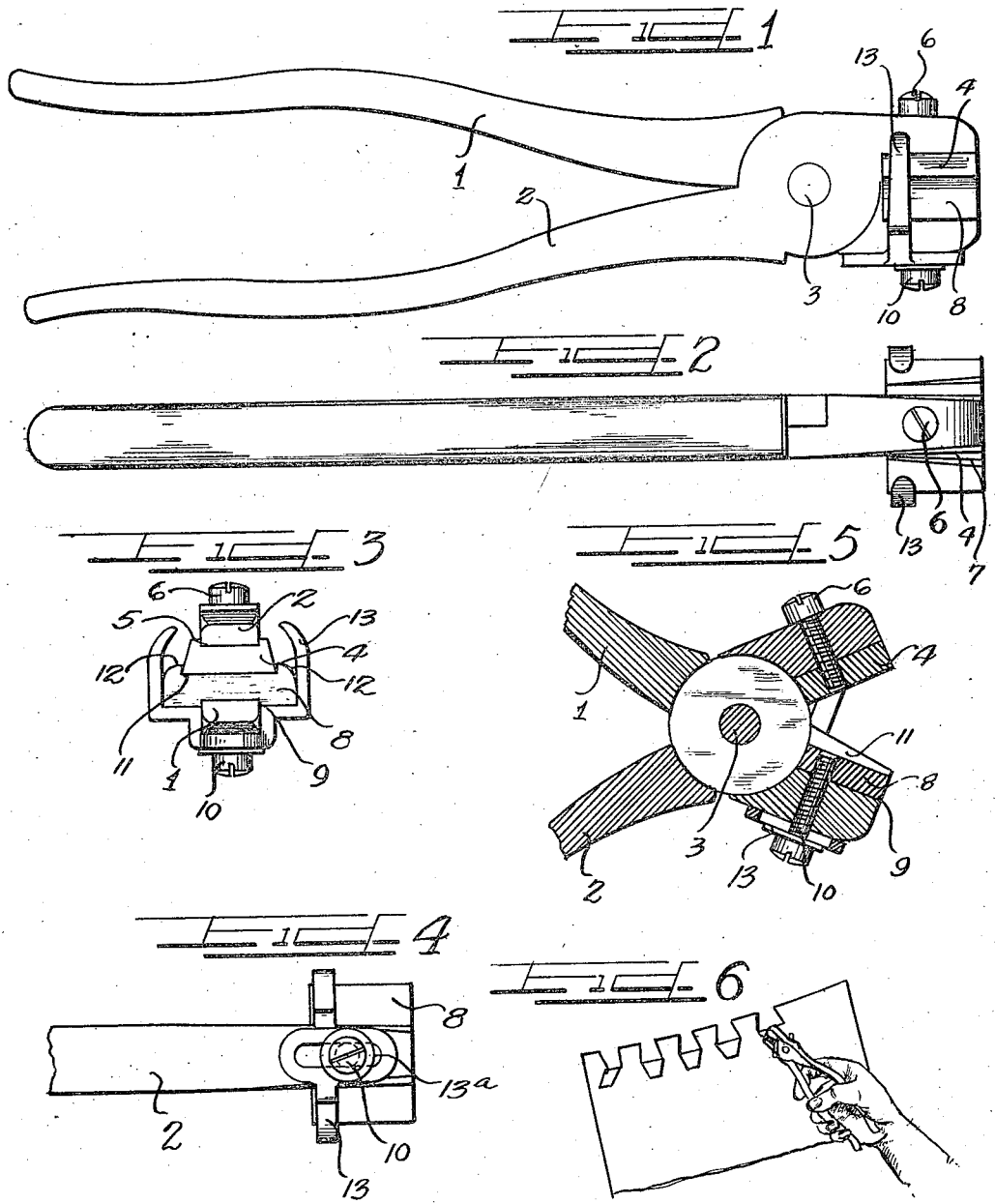
INVENTOR
Lemuel H. Purnell
BY Charles W. Niles
ATTY Patented Oct. 5, 1926.

1,602,169

UNITED STATES PATENT OFFICE.

LEMUEL H. PURNELL, OF CHICAGO, ILLINOIS.

SHEARING TOOL.

Application filed March 23, 1925. Serial No. 18,959.

This application is a continuation in part of my application Serial No. 735,254, filed September 2, 1924.

This invention relates to a tool adapted for partially cutting blanks from the margin of sheet metal plates, pipes or cylindrical forms, without damaging or injuring the latter, and bending the partially cut blanks at an angle to the plane of the sheet or cylindrical form without distorting the adjacent metal.

The invention comprises the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is a side elevational view of the tool.

Figure 2 is a top plan view of the tool.

Figure 3 is a front elevational view of the tool.

Figure 4 is a fragmentary portion, plan view of the tool.

Figure 5 is an enlarged fragmentary central and longitudinal sectional view of the tool showing the jaws in open position.

Figure 6 illustrates the use of the tool in partially cutting blanks from the margin of a sheet metal member and bending the same at an angle.

As shown on the drawings:

Referring to the drawings it will be observed that the tool consists of a pair of crossed levers 1 and 2 which are pivoted together intermediate their ends by a pivot 3 which is spaced a suitable distance from the forward ends of the levers to provide jaws of suitable length, which however should be relatively short with relation to the power arms of the levers to give sufficient power.

The upper jaw which is on the lever 2 comprises a male shearing element 4 which is in the present instance shown as a separate member having a groove 5 in its upper surface to receive the upper jaw to which it is attached by a screw 6 or the like. While the shearing element 4 may be of any desired shape or formation, in the present instance, it is shown in Figure 2 as of dovetail formation for partially shearing dovetail blanks from the margin of a sheet of metal; for this purpose it is only designed with cutting edges upon its sides. Where such a blank is partially cut and then bent by the tool, it is necessary that the head of the tool pass through the resulting notch. For this purpose, the sides of the male shearing element are bevelled from the front end thereof toward the rear as indicated at 7 in Figure 2. When the tool is designed for cutting a square or rectangular blank, such a bevel is not necessary. The sides of the shearing element 4 also converge or slope toward each other in an upward direction.

The lower jaw which is on the lever 1 comprises a female shearing element 8 which in the present instance is also shown as a separate member having a groove 9 in its lower surface to receive the jaw of the lever 1 to which it may be attached by a screw bolt 10 or the like. The female shearing element 8 has a dovetail channel 11 of a size and design to receive the male shearing element 4. This channel is open at its front and rear ends and its forward depth is only about one-sixteenth of an inch deep. Its rear depth is about one-eighth of an inch. The purpose of having the front end of the channel so shallow or in other words in providing such a limited overlap between the male and female shearing elements is to prevent injury or damage to the sheet metal from which the blank is partially severed. The upper margins of the female shearing element are rounded as indicated at 12 (Figure 3) so that there will be no tendency to flatten the metal in case a cylindrical member is being operated upon. As the front end of the channel in the female shearing element is open, obviously the lower end of the blank will not be severed.

In order to limit the depth of blank to be cut, an adjustable stop member 13 is secured upon the bolt 10. This stop member is substantially of U shape, being formed to fit over the lower jaw member and provided with an oblong loop or slot 13$^a$ upon its bottom for receiving the screw bolt 10. The sides of this stop extend upwardly upon opposite sides of the jaws and act as stops to limit the inward movement of the tool. It is obvious that through the provision of the oblong loop or slot the stop member may be adjusted for different depths of incisions.

It will be evident that this tool will merely make two incisions which due to the design of the shearing elements will diverge. Thus only two sides of a small blank will be sheared; the bottom will remain integral with the metal sheet or pipe operated upon. As soon as the blank is thuswise sheared, the tool may be swung through an angle for bending the partially severed blank at an angle to the sheet or pipe, the jaws gripping the blank during the bending operation, and the upper jaw including the male shearing element passing through the resulting notch.

It is characteristic of this tool that it is only susceptible of making two spaced cuts from the margin of a sheet metal member or the like to partially sever a blank and that the jaws only grip or engage such blank and that the upper jaw member including the male shearing element is designed to pass through the resulting notch of the blank. In other words it is a feature of this tool to partially sever a blank from the margin of a sheet metal member and to bend the same at an angle without distorting the sheet metal member.

I am aware that many changes may be made, and numerous details of construction may be varied through a wide range without departing from the principles of this invention, and I therefore do not purpose limiting the patent granted me hereon, otherwise than necessitated by the prior art.

I claim as my invention:—

1. A tool for partially cutting and bending a blank from sheet metal comprising a pair of crossed levers pivoted together intermediate their ends to provide co-acting jaw members, a male shearing element of dovetail formation upon the upper jaw member, a female shearing element of dovetail formation upon the lower jaw member, the sides of said male shearing element being bevelled for passing through the resulting notch of the blank.

2. In a tool for partially cutting a blank from the margin of a sheet metal member and bending the same, a pair of crossed levers pivoted together intermediate their ends to provide a pair of relatively short jaw members, a male shearing element on one jaw member, and a female shearing element on the other jaw member, said female shearing element having a channel like recess open at its ends for receiving the male shearing element, the male shearing jaw member being designed to pass through the resulting notch of a blank.

3. A tool for partially shearing a blank from sheet metal and bending the same, comprising a pair of cooperating jaw members, one jaw member having a channel like formation extending to the front end thereof, the other jaw member fitting in said channel like formation and being of such a shape as to completely pass thru the resulting notch during the bending movement of said tool.

4. In a tool for partially shearing a blank from the margin of a sheet metal member and bending the same, a pair of crossed levers pivoted together intermediate their ends to provide a pair of relatively short jaw members, said jaw members having interfitting shearing parts adapted for making spaced cuts in the margin of the sheet metal member, one of said jaw members being fashioned to completely pass thru the space between said cuts during the bending movement of said tool.

In testimony whereof I have hereunto subscribed my name.

LEMUEL H. PURNELL.